US008760369B2

(12) United States Patent
Nakahata

(10) Patent No.: US 8,760,369 B2
(45) Date of Patent: Jun. 24, 2014

(54) DISPLAY DEVICE

(75) Inventor: Yuji Nakahata, Kanagawa (JP)

(73) Assignee: Sony Corporation, Tokyo (JP)

( * ) Notice: Subject to any disclaimer, the term of this patent is extended or adjusted under 35 U.S.C. 154(b) by 345 days.

(21) Appl. No.: 12/660,180

(22) Filed: Feb. 22, 2010

(65) Prior Publication Data

US 2010/0225682 A1 Sep. 9, 2010

(30) Foreign Application Priority Data

Mar. 3, 2009 (JP) .............................. P2009-049837

(51) Int. Cl.
*G09G 3/00* (2006.01)
*G09G 5/02* (2006.01)
*H04N 13/04* (2006.01)

(52) U.S. Cl.
USPC .............................. 345/32; 345/695; 348/52

(58) Field of Classification Search
USPC ....................................... 345/695, 32; 348/58
See application file for complete search history.

(56) References Cited

U.S. PATENT DOCUMENTS

| 6,128,059 A | 10/2000 | Nishiguchi |
| 2004/0169807 A1* | 9/2004 | Rho et al. ...................... 349/139 |
| 2005/0012814 A1 | 1/2005 | Shen |
| 2007/0046777 A1* | 3/2007 | Song et al. ...................... 348/56 |
| 2007/0216828 A1* | 9/2007 | Jacobs ............................ 349/64 |
| 2008/0117231 A1* | 5/2008 | Kimpe ........................... 345/629 |
| 2009/0079761 A1* | 3/2009 | Kokojima ..................... 345/619 |

FOREIGN PATENT DOCUMENTS

| EP | 0860730 A2 | 8/1998 |
| EP | 2023645 A2 | 2/2009 |
| JP | 10-063199 A | 3/1998 |

OTHER PUBLICATIONS

European Search Report EP 10154097 dated Jun. 7, 2010.
European Search Report from EP Application No. 13190147, dated Feb. 12, 2014.

* cited by examiner

*Primary Examiner* — Jonathan Boyd
(74) *Attorney, Agent, or Firm* — Lerner, David, Littenberg, Krumholz & Mentlik, LLP

(57) ABSTRACT

A display device includes: a panel portion, on which a plurality of sub-pixels with a discrete bus line form each individual pixel, the plurality of sub-pixels that form the individual pixel being sequentially arranged in a horizontal and a vertical direction, the panel portion displaying a two-dimensional image or a three-dimensional image by application of a signal via the bus line; and a filter portion, provided on a front surface of the panel portion, that alternately changes, for each of predetermined horizontal regions, a polarization state of light passing through the panel portion. A boundary of each of the horizontal regions of the filter portion is positioned within a range of a first sub-pixel of each of the plurality of sub-pixels. The first sub-pixel displays a different image when the two-dimensional image is displayed on the panel portion to when the three-dimensional image is displayed on the panel portion.

4 Claims, 8 Drawing Sheets

DISPLAY DEVICE

CROSS-REFERENCE TO RELATED APPLICATION

The present application claims priority from Japanese Patent Application No. JP 2009-049837 filed in the Japanese Patent Office on Mar. 3, 2009, the entire content of which is incorporated herein by reference.

BACKGROUND OF THE INVENTION

1. Field of the Invention

The present invention relates to a display device.

2. Description of the Related Art

Display devices exist in which an image displayed on a screen is perceived by a viewer as a stereoscopic three-dimensional image. In order to cause the viewer to perceive the image as a stereoscopic three-dimensional image, it is necessary to display the image on the screen using a different display method than a normal display method. One example of such a display method is a technique in which the viewer is caused to perceive an image as a stereoscopic image by changing a polarization state of an image for the right eye and of an image for the left eye (refer to Japanese Patent Application Publication No. JP-A-10-63199, for example). By changing the polarization state of the image for the right eye and the image for the left eye, and by the viewer wearing glasses with the polarization state changed on the left and right (which thus enable the viewer to view the image for the right eye using his or her right eye and to view the image for the left eye using his or her left eye), an image displayed on the screen can be perceived as a stereoscopic three-dimensional image.

As one technique in which the polarization state is changed for the image for the right eye and the image for the left eye, there is a technique in which a polarization control filter is used to change the polarization state of the image for the right eye and the image for the left eye (refer to Japanese Patent Application Publication No. JP-A-10-63199). However, in display devices using known polarization control filters, light is insufficiently split on a boundary along which the polarization state of the filter changes. When the light is insufficiently split, a phenomenon occurs in which a part of the image for the right eye enters into the left eye and a part of the image for the left eye enters into the right eye (this phenomenon is known as "crosstalk").

In known art, therefore, in order to suppress the occurrence of crosstalk, a method is used in which a black matrix is arranged on the boundary section along which the polarization state of the filter changes. By inhibiting mixing of light by arranging the black matrix on the boundary section in which the polarization state of the filter changes, the occurrence of crosstalk can be suppressed.

SUMMARY OF THE INVENTION

In addition to displaying a three-dimensional image that is perceived by the viewer as a stereoscopic image, this type of display device can also display a normal two-dimensional image. However, when the black matrix is arranged on the boundary section in which the polarization state of the polarization control filter changes, when displaying a normal two-dimensional image on the screen, the black matrix causes deterioration in luminance.

In light of the foregoing, it is desirable to provide a novel and improved display device that is capable of displaying both a two-dimensional image and a three-dimensional image, and is further capable of suppressing the occurrence of crosstalk when displaying the three-dimensional image and also avoiding deterioration in luminance when displaying the two-dimensional image.

According to an embodiment of the present invention, there is provided a display device including a panel portion, on which a plurality of sub-pixels that each have a discrete bus line form each individual pixel, the plurality of sub-pixels that form the individual pixel being sequentially arranged in a horizontal and a vertical direction, the panel portion displaying one of a two-dimensional image and a three-dimensional image by application of a signal via the bus line and a filter portion that is provided on a front surface of the panel portion and that alternately changes, for each of predetermined horizontal regions, a polarization state of light that passes through the panel portion. A boundary of each of the horizontal regions of the filter portion is positioned within a range in which a first sub-pixel of each of the plurality of sub-pixels is provided, and the first sub-pixel displays a different image when the two-dimensional image is displayed on the panel portion to when the three-dimensional image is displayed on the panel portion.

With the above structure, on the panel portion, the plurality of sub-pixels, which each have the discrete bus line, form each of the individual pixels, and the plurality of sub-pixels forming each of the individual pixels are sequentially arranged in the horizontal and the vertical directions. The panel portion displays one of the two-dimensional image and the three-dimensional image in accordance with a signal applied via the bus line. The filter portion, which is provided on the front surface of the panel portion, alternately changes, for each of the predetermined horizontal regions, the polarization state of the light that passes through the panel portion. Furthermore, the boundary of each of the horizontal regions of the filter portion is positioned within the range in which the first sub-pixel of each of the plurality of sub-pixels is provided. The first sub-pixel displays a different image when the two-dimensional image is displayed on the panel portion than when the three-dimensional image is displayed on the panel portion. As a result, deterioration in luminance can be avoided when the two-dimensional image is displayed, and crosstalk can also be suppressed when the three-dimensional image is displayed.

The display device may further including a signal supply control portion that controls supply of an image signal to the panel portion. When the three-dimensional image is displayed on the panel portion, the signal supply control portion supplies the image signal that causes the first sub-pixel positioned on the boundary of each of the horizontal regions of the filter portion to be displayed in black.

After the first sub-pixel is displayed in black, the signal supply control portion may perform control such that a new signal is not supplied to the first sub-pixel.

The display device may further including a signal supply control portion that controls supply of an image signal to the panel portion. The signal supply control portion changes parameters relating to correction of picture quality of the image signal supplied to the plurality of sub-pixels such that the parameters are different when the two-dimensional image is displayed on the panel portion to when the three-dimensional image is displayed on the panel portion.

The filter portion may be provided such that the boundary of each of the horizontal regions is positioned on a dark line of the first sub-pixel A length in the vertical direction of the first sub-pixel may be shorter than a sum of lengths in the vertical direction of all the other sub-pixels in the pixel.

According to the present invention described above, it is possible to provide a novel and improved display device that can display both a two-dimensional image and a three-dimensional image. With the display device, as the boundary of each of the horizontal regions of the filter portion is positioned within the range in which the first sub-pixel of each of the plurality of sub-pixels is provided, crosstalk can be suppressed when displaying the three-dimensional image, and deterioration in luminance can also be avoided when displaying the two-dimensional image.

BRIEF DESCRIPTION OF THE DRAWINGS

FIG. 6 is an explanatory diagram showing a case in which boundaries between polarization regions 169a and polarization regions 169b of a polarization control filter 168 are arranged such that they are aligned with boundaries of liquid crystal domains of sub-pixels 173a, 175a and 177a;

DETAILED DESCRIPTION OF THE EMBODIMENT(S)

Figure 1:
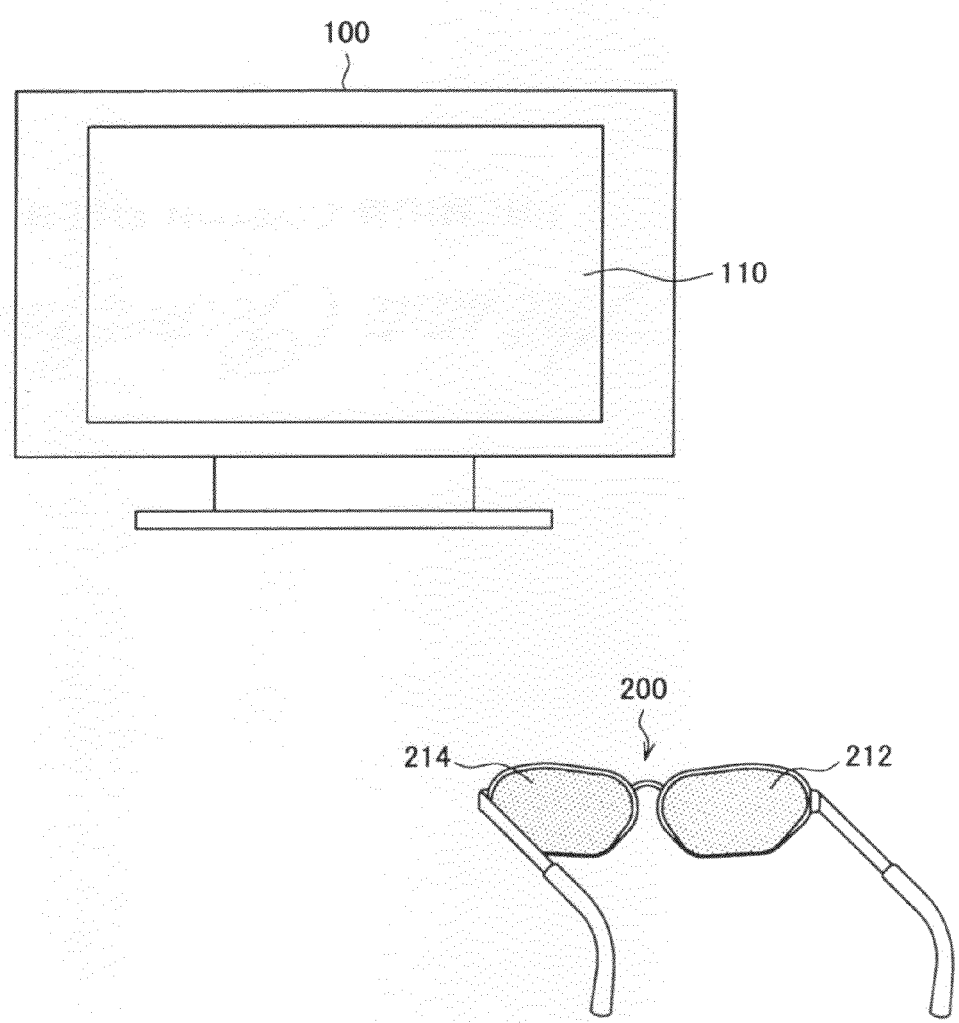
FIG. 1 is an explanatory diagram showing the outer appearance of a display device 100 according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

An exemplary embodiment of the present invention will be described in detail in the following order.

1. Example of known art
2. Embodiment of present invention
2-1. Structure of display device according to embodiment of present invention
2-2. Functional structure of display device according to embodiment of present invention
2-3. Structure of image display portion
2-4. Array of pixels on liquid crystal panel
3. Conclusion

1. EXAMPLE OF KNOWN ART

Figure 7:
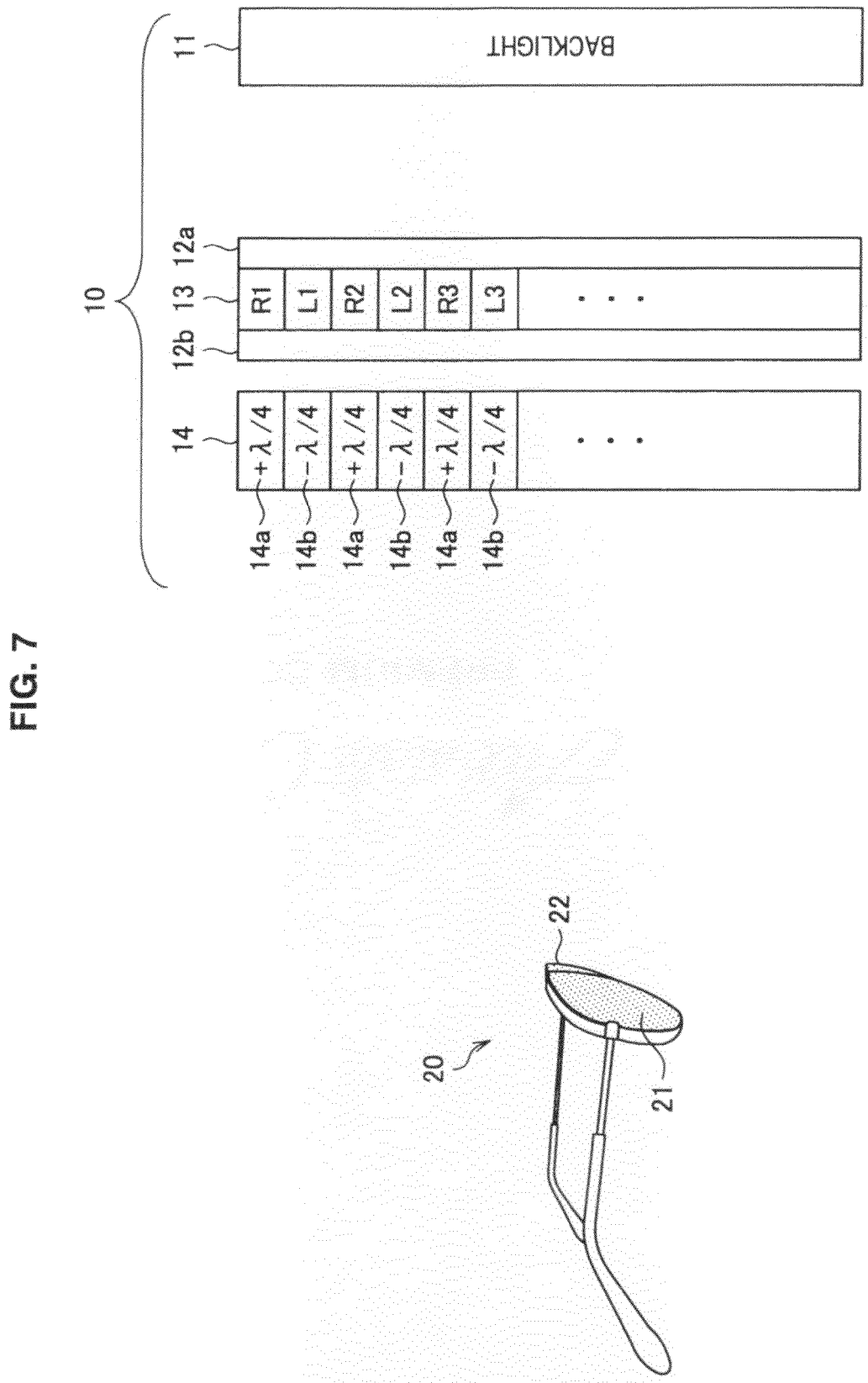
FIG. 7 is an explanatory diagram showing an example of a known display device that uses a polarization control filter.

First, before giving a detailed description of the exemplary embodiment of the present invention, an image display method on a display device that displays a three-dimensional image according to known art will be described. FIG. 7 is an explanatory diagram showing an example of a known display device that uses a polarization control filter.

FIG. 7 shows a known display device 10 that displays the three-dimensional image, shown schematically as a cross section seen from a side. The known display device 10 that displays the three-dimensional image includes a backlight 11, polarizing plates 12a and 12b, a liquid crystal display element 13 and a polarization control filter 14.

The type of known display device 10 that displays the three-dimensional image shown in FIG. 7 polarizes light from the backlight 11 using the polarizing plates 12a and 12b and the liquid crystal display element 13. Note that, by application of a signal to the liquid crystal display element 13, an image for the right eye and an image for the left eye are alternately displayed on scan lines.

In addition, in the display device 10, light that has passed through the polarizing plate 12b is circularly polarized by the polarization control filter 14 that is provided on the front surface of the polarizing plate 12b. The polarization control filter 14 has polarization regions 14a and polarization regions 14b that each have quarter wave plates used to either right-hand circularly polarize or left-hand circularly polarize the light that has passed through the polarizing plate 12b. Respective optical axes of the polarization regions 14a and the polarization regions 14b intersect orthogonally with each other, and light that forms the image for the right eye is right-hand circularly polarized, for example, while light that forms the image for the left eye is left-hand circularly polarized.

The circularly polarized light from the display device 10 can be seen through polarized glasses 20. The polarized glasses 20 are provided with a right eye image transmission portion 21 and a left eye image transmission portion 22. The right eye image transmission portion 21 is provided with a quarter wave plate and a polarizing lens (not shown in the figures) such that the right-hand circularly polarized light can pass through. The left eye image transmission portion 22 is provided with a quarter wave plate and a polarizing lens (not shown in the figures) such that the left-hand circularly polarized light can pass through. The right eye image transmission portion 21 blocks off the left-hand circularly polarized light, while the left eye image transmission portion 22 blocks off the right-hand circularly polarized light. As a result, when the viewer is wearing the polarized glasses 20, only the light that forms the image for the right eye enters the right eye and only the light that forms the image for the left eye enters the left eye.

When the viewer sees, through the polarized glasses 20, the light from the display device 10 that is circularly polarized in this way, the viewer can perceive the image displayed on the display device 10 as a stereoscopic three-dimensional image.

However, when the direction of the polarized light is controlled by the polarization control filter 14 that has the two polarization regions 14a and 14b as shown in FIG. 7, the light is not sufficiently split on boundaries between the polarization regions 14a and the polarization regions 14b. When the light is insufficiently split on these boundaries, when the viewer sees the light from the display device 10 through the polarized glasses 20, crosstalk occurs, in which part of the image for the right eye enters into the left eye and part of the image for the left eye enters into the right eye.

Figure 8:
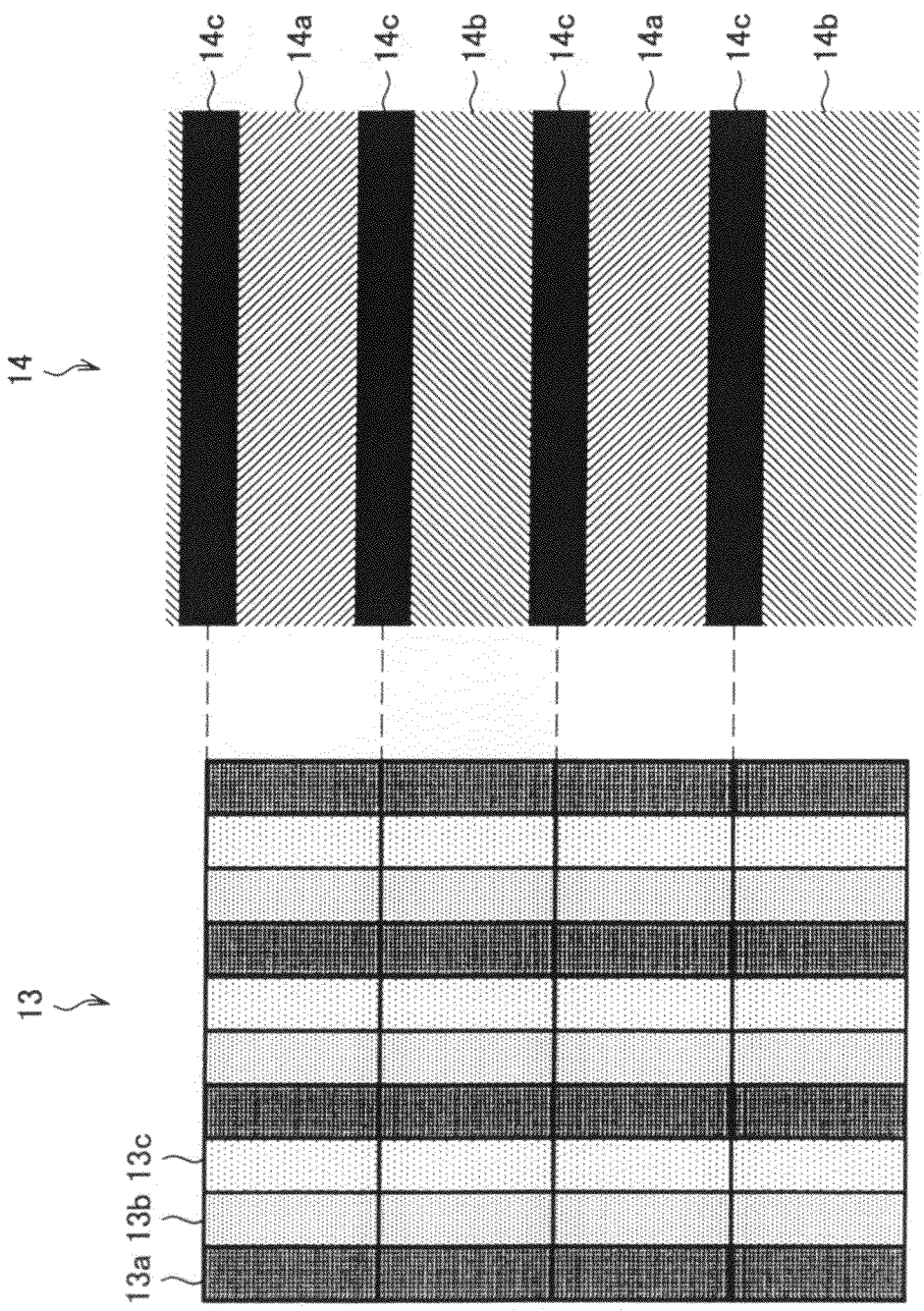
FIG. 8 is an explanatory diagram showing an example of a polarization control filter 14 provided with black matrices 14c.

To suppress this crosstalk, a technique is adopted that uses a polarization control filter on which black matrices are arranged on the boundary sections between the polarization regions. FIG. 8 is an explanatory diagram showing an example of the polarization control filter 14 that is provided with black matrices 14c. FIG. 8 also shows an array of pixels on the liquid crystal display element 13 that is used to display the image. The liquid crystal display element 13 includes red pixels 13a that emit a red color, blue pixels 13b that emit a blue color and green pixels 13c that emit a green color.

FIG. 8 shows the polarization control filter 14 on which the black matrices 14c are arranged in alignment with the boundary sections of the pixels. By using the polarization control filter 14 with the black matrices 14c arranged in this way, light is sufficiently split on the boundary sections between the polarization regions 14a and the polarization regions 14b. Thus, as light is sufficiently split on the boundary sections between the polarization regions 14a and the polarization regions 14b, crosstalk can be suppressed when the viewer sees the light from the display device 10 through the polarized glasses 20.

However, when the type of polarization control filter 14 provided with the black matrices 14c shown in FIG. 8 is used, light is blocked off in the sections on which the black matrices 14c are arranged, resulting in deterioration of luminance of the image displayed on the display device 10. In particular, when a normal image (a two-dimensional image) is displayed on the display device 10, the presence of the black matrices 14c on the polarization control filter 14 cause deterioration in the luminance.

Here, in an embodiment of the present invention that will be described hereinafter, an explanation will be given of a display device that suppresses crosstalk without providing black matrices on a polarization control filter, and that also does not experience deterioration in luminance when a normal image is displayed.

2. EMBODIMENT OF PRESENT INVENTION

Hereinafter, the structure of a display device 100 according to the embodiment of the present invention will be explained. First, the outer appearance of the display device 100 according to the embodiment of the present invention will be described. FIG. 1 is an explanatory diagram showing the outer appearance of the display device 100 according to the embodiment of the present invention. Additionally, FIG. 1 also shows polarized glasses 200, which are used to cause a viewer to perceive an image displayed on the display device 100 as a stereoscopic image.

The display device 100 shown in FIG. 1 is provided with an image display portion 110 that displays images. The display device 100 does not only display normal images on the image display portion 110, but can also display three-dimensional images on the image display portion 110 that are perceived by the viewer as stereoscopic images.

The structure of the image display portion 110 will be described in more detail later. As a simple description here, the image display portion 110 includes a light source, a liquid crystal panel and a pair of polarizing plates that sandwich the liquid crystal panel. Light from the light source is polarized in a predetermined direction by passing through the liquid crystal panel and the polarizing plates.

In addition, the image display portion 110 is provided with a polarization control filter that further circularly polarizes the light that has passed through the polarizing plates. The light that enters into the polarization control filter is circularly polarized and output in a predetermined direction by passing through the polarization control filter. When the viewer sees, through a right eye image transmission portion 212 and a left eye image transmission portion 214 of the polarized glasses 200, the light that has been circularly polarized by the polarization control filter, the viewer can perceive the image displayed on the image display portion 110 as a stereoscopic image.

On the other hand, when a normal image is displayed on the image display portion 110, by seeing the light output from the image display portion 110 as it is, the viewer can perceive the image as the normal image.

Note that, in FIG. 1, the display device 100 is portrayed as a television receiver, but the present invention is naturally not limited to this example of the form of the display device 100. The display device 100 according to the present invention may be, for example, a monitor that is used when connected to an electronic appliance such as a personal computer or the like, or it may be a mobile game console, a mobile telephone, or a portable music playback device and so on.

The outer appearance of the display device 100 according to the embodiment of the present invention is described above. Next, the functional structure of the display device 100 according to the embodiment of the present invention will be explained.

Figure 2:
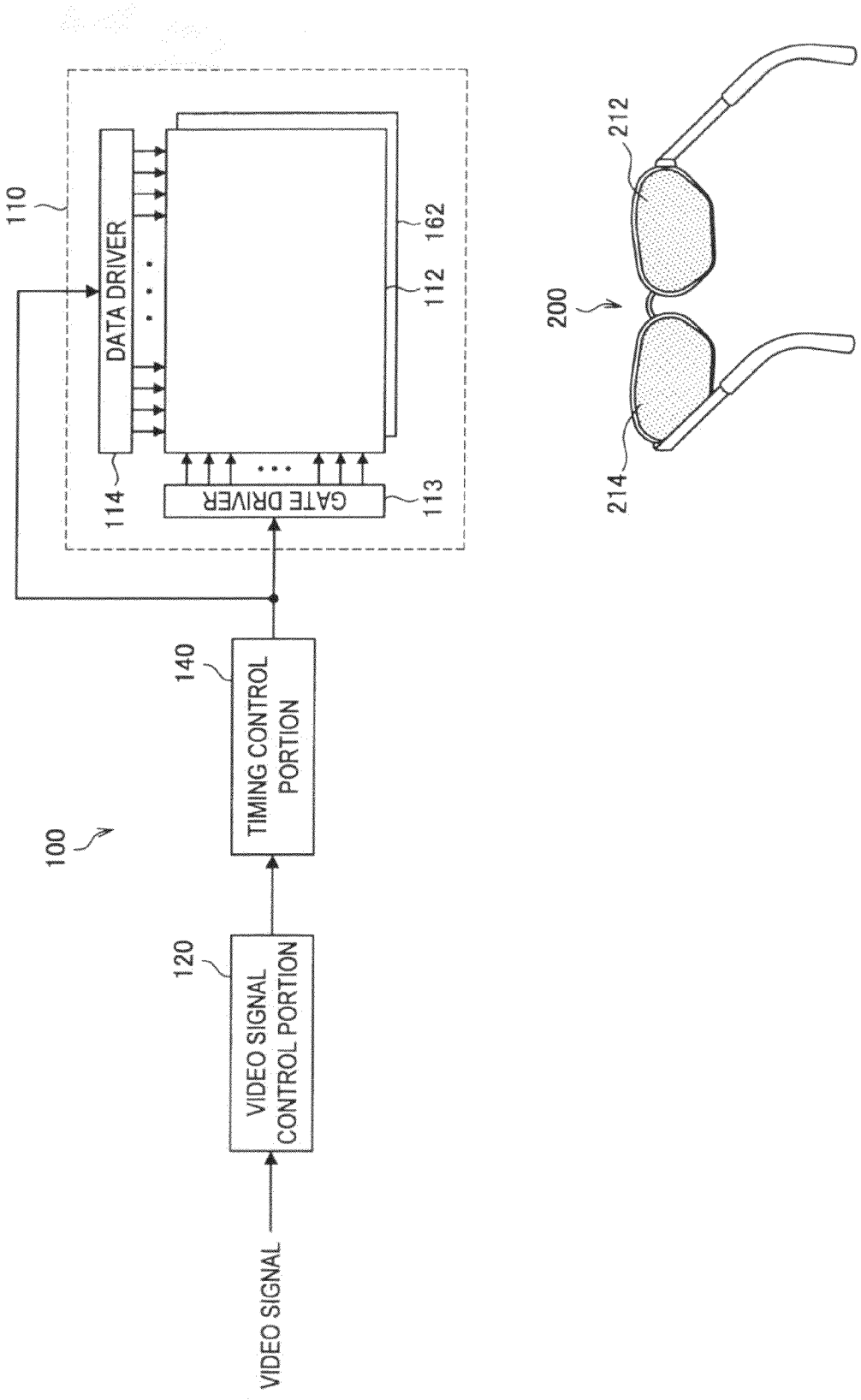
FIG. 2 is an explanatory diagram showing the functional structure of the display device 100 according to the embodiment of the present invention.

2-2. Functional Structure of Display Device According to Embodiment of Present Invention FIG. 2 is an explanatory diagram showing the functional structure of the display device 100 according to the embodiment of the present invention. Hereinafter, the functional structure of the display device 100 according to the embodiment of the present invention will be explained with reference to FIG. 2.

As shown in FIG. 2, the display device 100 according to the embodiment of the present invention includes the image display portion 110, a video signal control portion 120 and a timing control portion 140.

The image display portion 110 displays images in the manner described above, and when a signal is applied from an external source, display of images is performed in accordance with the applied signal. The image display portion 110 includes a display panel 112, a gate driver 113, a data driver 114 and a light source 162.

The display panel 112 displays images in accordance with the signal applied from an external source. Liquid crystal molecules having a predetermined orientation are filled in a space between transparent plates, made of glass or the like, of the display panel 112. A drive system of the display panel 112 may be a twisted nematic (TN) system, a vertical alignment (VA) system, or an in-place-switching (IPS) system. In the following explanation, the drive system of the display panel 112 is the TN system, unless otherwise specified, but it goes without saying that the present invention is not limited to this example. Application of the signal to the display panel 112 is performed by the gate driver 113 and the data driver 114.

The gate driver 113 is a driver that drives a gate bus line (not shown in the figures) of the display panel 112. A signal is transmitted from the timing control portion 140 to the gate driver 113, and the gate driver 113 outputs a signal to the gate bus line in accordance with the signal transmitted from the timing control portion 140.

The data driver 114 is a driver that generates a signal that is applied to a data line (not shown in the figures) of the display panel 112. A signal is transmitted from the timing control portion 140 to the data driver 114. The data driver 114 generates a signal to be applied to the data line, in accordance with the signal transmitted from the timing control portion 140, and outputs the generated signal.

The light source 162 is provided on the furthermost side of the image display portion 110 as seen from the viewer. When an image is displayed on the image display portion 110, white light that is not polarized (unpolarized light) is output from the light source 162 to the display panel 112 positioned on the side of the viewer.

When the video signal control portion 120 receives a video signal from an external source, the video signal control portion 120 performs various types of signal processing on the received video signal such that it is suitable for three-dimensional image display on the image display portion 110 and outputs the processed signal. The video signal on which signal processing has been performed by the video signal control portion 120 is transmitted to the timing control portion 140. The signal processing by the video signal control portion 120 is, for example, as described below.

When a video signal to display the image for the right eye on the image display portion 110 (a right eye video signal) and a video signal to display the image for the left eye on the image display portion 110 (a left eye video signal) are received by the video signal control portion 120, the video signal control portion 120 generates, from the two received video signals, a video signal for a three-dimensional image. The video signal for the three-dimensional image is generated by the video signal control portion 120 such that, for example, the image for the right eye is displayed on the odd numbered scan lines of the display panel in the image display portion 110 and the image for the left eye is displayed on the even numbered scan lines.

In accordance with the signal transmitted from the video signal control portion 120, the timing control portion 140 generates a pulse signal that is used to operate the gate driver 113 and the data driver 114. When the pulse signal is generated by the timing control portion 140, and the gate driver 113 and the data driver 114 receive the pulse signal generated by the timing control portion 140, an image corresponding to the signal transmitted from the video signal control portion 120 is displayed on the display panel 112.

The functional structure of the display device 100 according to the embodiment of the present invention is described above. Next, the structure of the image display portion 110 of the display device 100 according to the embodiment of the present invention will be explained.

2-3. Structure of Image Display Portion

Figure 3:
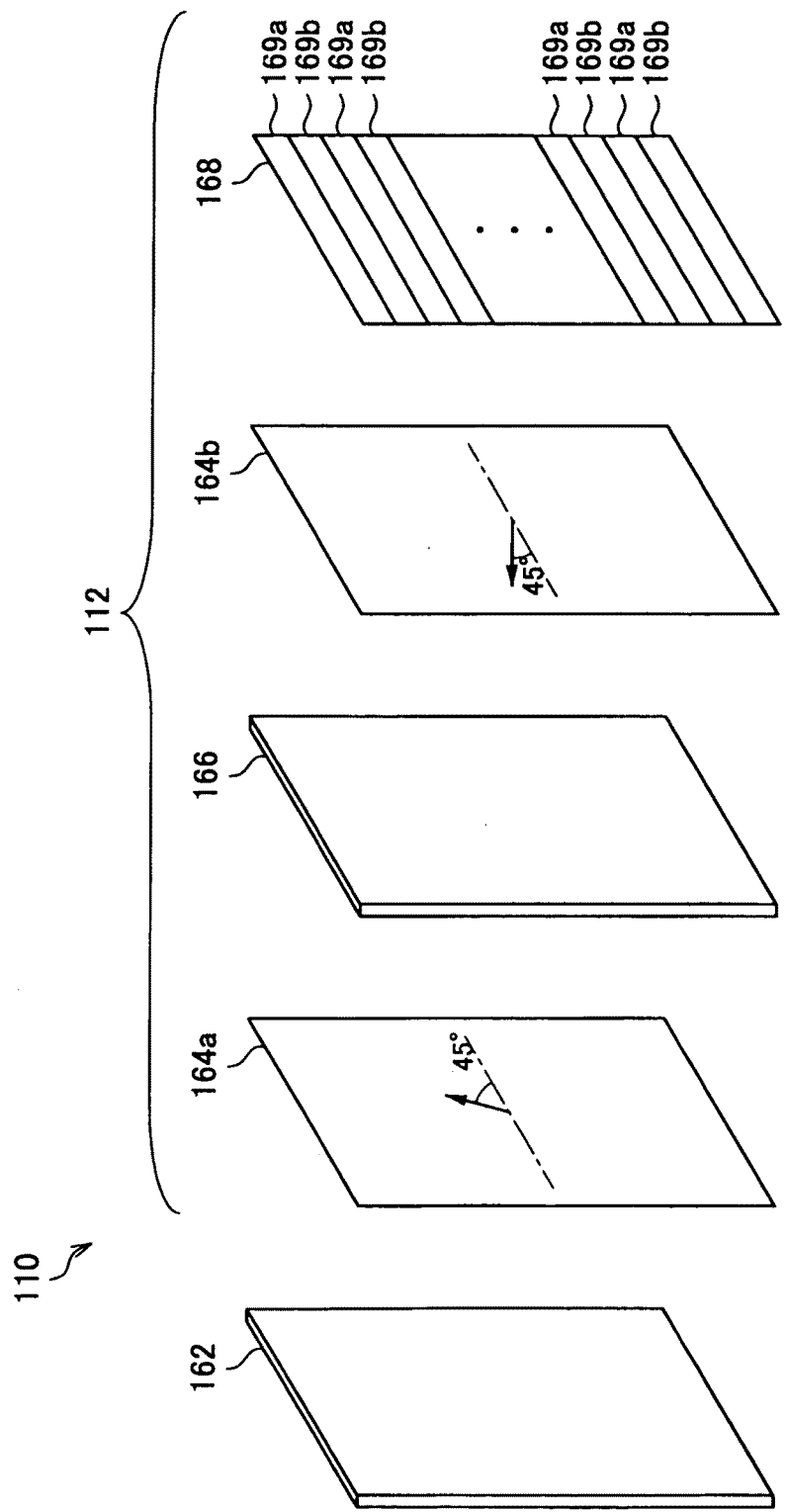
FIG. 3 is an explanatory diagram showing an exploded perspective view of the structure of an image display portion 110 according to the embodiment of the present invention.

FIG. 3 is an explanatory diagram showing an exploded perspective view of the structure of the image display portion 110 according to the embodiment of the present invention. Hereinafter, the structure of the image display portion 110 according to the embodiment of the present invention will be explained with reference to FIG. 3.

As shown in FIG. 3, the image display portion 110 according to the embodiment of the present invention includes the light source 162, polarizing plates 164a and 164b, a liquid crystal panel 166 and a polarization control filter 168. Note that the display panel 112 shown in FIG. 2 includes the polarizing plates 164a and 164b, the liquid crystal panel 166 and the polarization control filter 168.

The light source 162 is provided on the furthermost side of the image display portion 110 as seen from the side of the viewer. When an image is displayed on the image display portion 110, white light that is not polarized (unpolarized light) is output from the light source 162 to the display panel 112 positioned on the side of the viewer. The light source 162 may use a light-emitting diode, for example, or may use a cold cathode tube. Note that the light source 162 shown in FIG. 3 is a surface light source, but the present invention is not limited to this form of light source. For example, the light source may be arranged around the peripheral edges of the display panel 112, and may output light to the display panel 112 by diffusing the light from the light source using a diffuser panel etc. Alternatively, for example, a point light source and a condenser lens may be used in combination in place of the surface light source.

The polarizing plate 164a is provided between the light source 162 and the liquid crystal panel 166. The polarizing plate 164a has a transmission axis and an absorption axis that is perpendicular to the transmission axis. When the unpolarized white light output from the light source 162 enters the polarizing plate 164a, of the unpolarized white light, the polarizing plate 164a allows light that has a polarization axis parallel with the direction of the transmission axis to pass through, and blocks off light that has a polarization axis parallel with the direction of the absorption axis. The light that passes through the polarizing plate 164a enters the liquid crystal panel 166.

The liquid crystal panel 166 is an example of a panel portion of the present invention and is a panel in which a space between two transparent plates, such as glass substrates, is filled with liquid crystal molecules that have a predetermined orientation. When the drive system of the display panel 112 is the TN system, the space between the two transparent plates is filled by the liquid crystal molecules that are twisted and oriented to a predetermined angle (ninety degrees, for example). Note that, when the drive system of the display panel 112 is the VA system, the liquid crystal molecules are oriented vertically with respect to electrodes. The liquid crystal panel 166 is, for example, a thin film transistor (TFT) liquid crystal display panel. In a state in which voltage is not applied to the liquid crystal panel 166, the light that enters the liquid crystal panel 166 is displaced by ninety degrees and output from the liquid crystal panel 166. On the other hand, in a state in which voltage is applied to the liquid crystal panel 166, as the twist of the liquid crystal molecules is removed, the light that enters the liquid crystal panel 166 is output from the liquid crystal panel 166 as it is, in an unchanged state of polarization.

When a pulse signal is applied from the gate driver 113 and the data driver 114, the liquid crystal panel 166 displays an image in accordance with the pulse signal. In the present embodiment, when an image is displayed on the image display portion 110 such that it is perceived as a stereoscopic three-dimensional image by the viewer, the image for the right eye and the image for the left eye are alternately displayed on the liquid crystal panel 166 one line at a time. In the present embodiment, the image display portion 110 is structured such that the image for the right eye is displayed on the odd numbered lines of the liquid crystal panel 166 and the image for the left eye is displayed on the even numbered lines of the liquid crystal panel 166.

The liquid crystal panel 166 has a plurality of pixels in the horizontal direction and the vertical direction, and the image is displayed using the plurality of pixels. Each single pixel is formed of a plurality of sub-pixel electrodes that have a discrete bus line and non-linear element. The structure of the pixels of the liquid crystal panel 166 according to the present embodiment will be explained in more in detail later. In simple terms, in the present embodiment, one pixel is formed of two sub-pixels. By controlling the display on one of these two sub-pixels, the occurrence of crosstalk can be suppressed when the three-dimensional image is displayed, and deterioration in luminance can also be avoided when the two-dimensional image is displayed.

Note that, as described above, the drive system of the display panel 112 may be a system other than the TN system. The VA system or the IPS system may be used, for example. When the drive system of the display panel 112 is a system other than the TN system, the space between the polarizing plates of the liquid crystal panel 166 may be filled with liquid crystal molecules that are not twisted.

The polarizing plate 164b is provided on the front-most side of the liquid crystal panel 166 as seen from the side of the viewer. The polarizing plate 164b has a transmission axis and an absorption axis that is perpendicular to the transmission axis. The transmission axis of the polarizing plate 164b orthogonally intersects the transmission axis of the polarizing plate 164a. Therefore, the absorption axis of the polarizing plate 164b intersects orthogonally with the absorption axis of the polarizing plate 164a. When the light that has passed through the liquid crystal panel 166 enters the polarizing plate 164b, of the light that has passed through the liquid crystal panel 166, the polarizing plate 164b allows light that has a polarization axis parallel with the direction of the transmission axis to pass through, and blocks off light that has a polarization axis parallel with the direction of the absorption axis. The light that passes through the polarizing plate 164b enters the polarization control filter 168.

The polarization control filter 168, which is provided on the front-most side of the polarizing plate 164b as seen from the side of the viewer, performs one of either right-hand circular or left-hand circular polarization on the light that has passed through the polarizing plate 164b. In order to perform either right-hand circular polarization or left-hand circular polarization, the polarization control filter 168 has polarization regions 169a and 169b that each has quarter wave plates. Respective optical axes of the polarization regions 169a and the polarization regions 169b intersect orthogonally with each other, and light that forms the image for the right eye is right-hand circularly polarized, for example, by the polarization region 169a, while light that forms the image for the left eye is left-hand circularly polarized by the polarization region 169b.

When an image that is to be viewed as a stereoscopic three-dimensional image by the viewer is displayed on the image display portion 110, as described above, the image for the right eye and the image for the left eye are alternately displayed on the liquid crystal panel 166 one line at a time. Therefore, the polarization region 169a and the polarization region 169b of the polarization control filter 168 are provided such that they correspond to each scan line of the liquid crystal panel 166.

As described above, the image display portion 110 according to the present embodiment is structured such that the image for the right eye is displayed on the odd numbered lines and the image for the left eye is displayed on the even numbered lines of the liquid crystal panel 166, respectively. Therefore, the polarization control filter 168 is provided on the front-most side (the side of the viewer) of the polarizing plate 164b such that the polarization regions 169a are positioned in alignment with positions of the odd numbered lines of the liquid crystal panel 166 and the polarization regions 169b are positioned in alignment with positions of the even numbered lines of the liquid crystal panel 166, respectively.

When the light that is circularly polarized by the polarization control filter 168 is seen by the viewer through the polarized glasses 200, the viewer perceives an image displayed on the image display portion 110 as a stereoscopic three-dimensional image.

The structure of the image display portion 110 according to the embodiment of the present invention is explained above. Next, a pixel array on the liquid crystal panel 166 according to the embodiment of the present invention will be explained.

2-4. Array of Pixels on Liquid Crystal Panel

Figure 4:
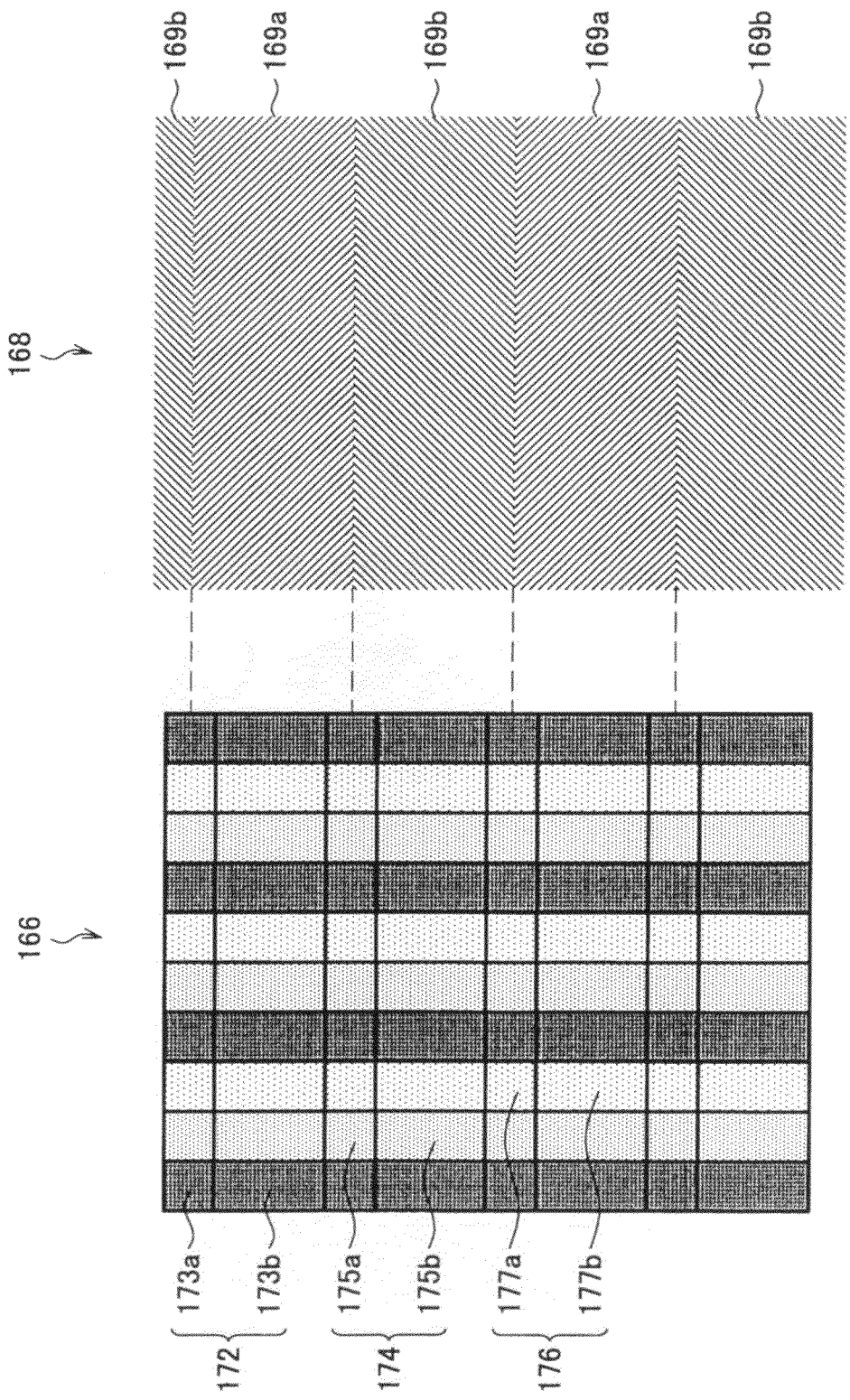
FIG. 4 is an explanatory diagram illustrating an array of pixels on a liquid crystal panel 166 according to the embodiment of the present invention.

FIG. 4 is an explanatory diagram illustrating the array of pixels on the liquid crystal panel 166 according to the embodiment of the present invention. In FIG. 4, the polarization control filter 168 is shown together with the liquid crystal panel 166. Hereinafter, the pixel array of the liquid crystal panel 166 according to the embodiment of the present invention will be described with reference to FIG. 4.

As shown in FIG. 4, the liquid crystal panel 166 according to the embodiment of the present invention is formed of red pixels 172 that emit a red color, blue pixels 174 that emit a blue color and green pixels 176 that emit a green color: The respective pixels are repeatedly arranged in the horizontal and the vertical directions.

The red pixels 172 are formed of sub-pixels 173a and 173b, the blue pixels 174 are formed of sub-pixels 175a and 175b and the green pixels 176 are formed of sub-pixels 177a and 177b.

As shown in FIG. 4, the sub-pixels 173a, 175a and 177a have a same length in the vertical direction, while in the horizontal direction, the sub-pixels 173a, 175a and 177a are repeatedly arranged in that order. The sub-pixels 173b, 175b and 177b have a same length in the vertical direction, while in the horizontal direction, the sub-pixels 173b, 175b and 177b are repeatedly arranged in that order.

In the present embodiment, the sub-pixels are formed such that the length of the sub-pixels 173a, 175a and 177a in the vertical direction is shorter than the length of the sub-pixels 173b, 175b and 177b in the vertical direction.

The polarization control filter 168 is also shown in FIG. 4. For explanatory ease, the liquid crystal panel 166 and the polarization control filter 168 are shown alongside each other in the horizontal direction in FIG. 4, but in the actual display device 100, the polarization control filter 168 is provided on the front surface of the liquid crystal panel 166 (the side of the viewer). The polarization control filter 168 performs either right-hand circular polarization or left-hand circular polarization on one pixel at a time in the vertical direction. Note that, in the present embodiment, the polarization control filter 168 performs one of right-hand circular and left-hand circular polarization on one pixel at a time in the vertical direction, but the present invention is not limited to this example.

Additionally, as shown in FIG. 4, boundaries between the polarization regions 169a and 169b of the polarization control filter 168 are provided such that they fall within ranges of the sub-pixels 173a, 175a and 177a.

When the display of a normal image (two-dimensional image) on the display device 100 is performed, the image is displayed on the liquid crystal panel 166 using all of the sub-pixels as shown in FIG. 4. In contrast to the example of known art shown in FIG. 8, it can be seen that when the normal image is displayed on the display device 100, there are no black matrices. By displaying the normal image on the display device 100 in this way, it is possible to display an image with higher luminance on the image display portion 110 than in the known display device that uses black matrices on the polarization control filter.

Figure 5:
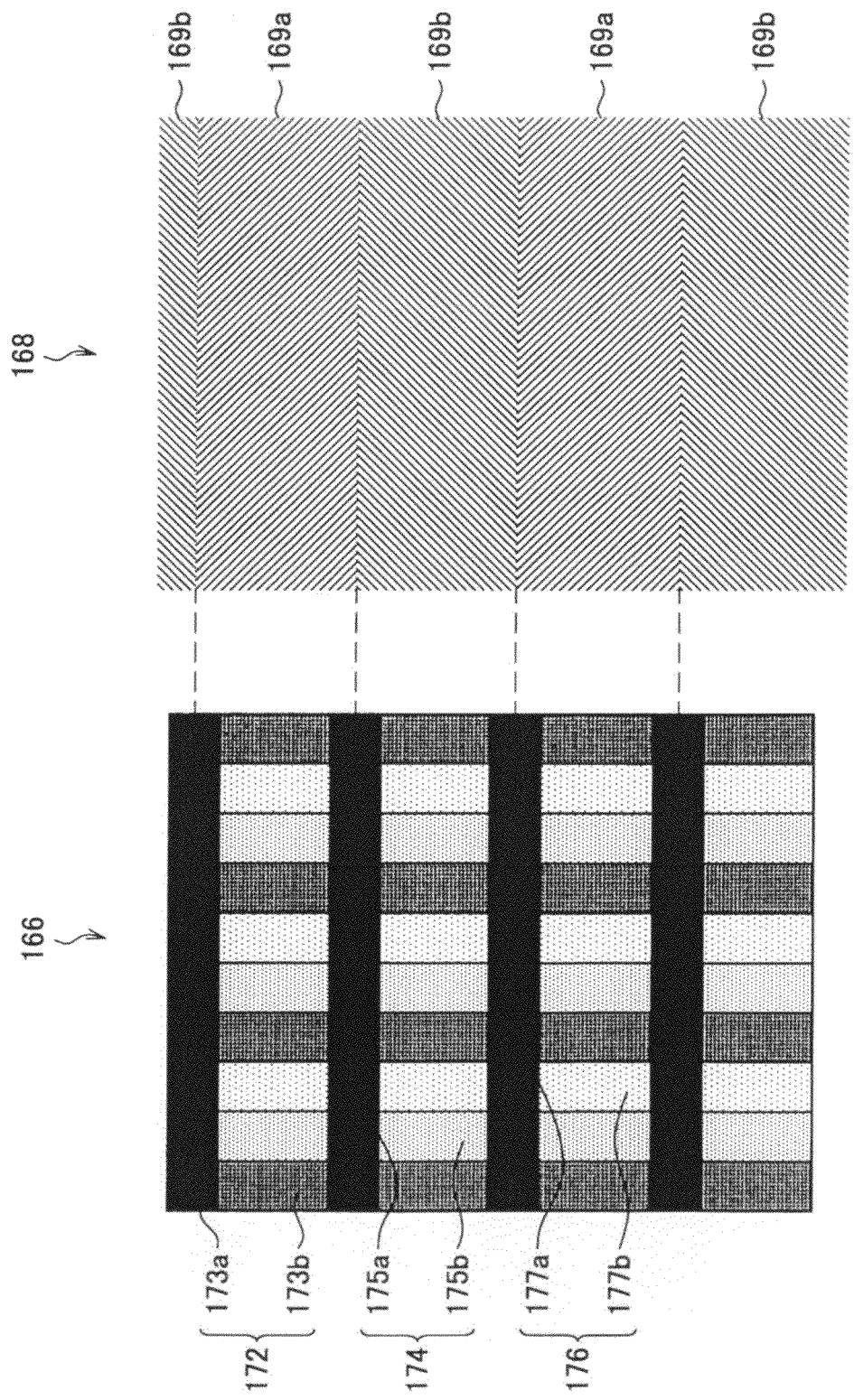
FIG. 5 is an explanatory diagram showing a light emitting state of the pixels in a case in which an image being displayed is perceived by a viewer as a stereoscopic image (a 3D image) on the display device 100 according to the present embodiment.

On the other hand, when displaying an image on the display device 100 that is perceived by the viewer as a stereoscopic image (a three-dimensional image), the image is displayed on the sub-pixels using a different pattern than that used to display the two-dimensional image. FIG. 5 is an explanatory diagram showing a light emitting state of the pixels when a three-dimensional image is displayed on the display device 100 according to the embodiment of the present invention. Note here that the polarization control filter 168 is shown together with the liquid crystal panel 166 in FIG. 5. Similarly to FIG. 4, for explanatory ease, the liquid crystal panel 166 and the polarization control filter 168 are shown alongside each other in the horizontal direction in FIG. 5, but in the actual display device 100, the polarization control filter 168 is provided on the front surface of the liquid crystal panel 166 (the side of the viewer).

As shown in FIG. 5, in the display device 100 according to the present embodiment, when displaying an image that is perceived as a stereoscopic image by the viewer, the color black is displayed on the sub-pixels 173a, 175a and 177a that are positioned on boundaries between polarizing plates 169a and polarizing plates 169b of the polarization control filter 168, while the image is displayed by the other sub-pixels 173b, 175b and 177b.

Note that the display of each of the sub-pixels may be controlled by the video signal control portion 120. In the present embodiment, when displaying a three-dimensional image on the image display portion 110, signal processing is performed by the video signal control portion 120 such that the image for the right eye is displayed on the odd numbered lines of the liquid crystal panel 166 and the image for the left eye is displayed on the even numbered lines. The video signal control portion 120 may then transmit a signal to the timing control portion 140 such that the color black is displayed on the sub-pixels 173a, 175a and 177a of each of the pixels.

By displaying the color black on the sub-pixels 173a, 175a and 177a in this way, the black display sub-pixels 173a, 175a and 177a perform the function of the black matrices of the polarization control filter used in the display device according to the example of known art. Thus, in the display device 100 according to the present embodiment, when displaying an image to be seen by the viewer as a stereoscopic image, it is possible to suppress the occurrence of crosstalk by displaying the sub-pixels 173a, 175a and 177a in the color black.

In addition, when displaying a three-dimensional image on the image display portion 110, by displaying in black the sub-pixels 173a, 175a and 177a that are shorter in the vertical direction than the other sub-pixels, the display device 100 can display three-dimensional images without any loss of luminance and picture quality. Note that, in the present embodiment, each single pixel is formed of two sub-pixels, but the present invention is not limited to this example, and each pixel may be formed of three or more sub-pixels. When each pixel is formed of three or more sub-pixels, the sub-pixels may be formed such that the length in the vertical direction of the sub-pixels that are displayed in black is shorter than the sum of the lengths in the vertical direction of the other sub-pixels.

Note that, with the display device 100 according to the present embodiment, when displaying an image to be viewed as a stereoscopic image by the viewer, there are sub-pixels that are constantly displayed in black. As a result, when displaying a three-dimensional image on the display device 100 according to the present embodiment, various parameters relating to picture quality correction/compensation of image signals supplied to each of the sub-pixels can be different to those used when displaying two-dimensional images. These parameters relating to picture quality include gamma correction, accurate color capture (ACC) processing and overdrive etc.

For example, taking gamma correction as an example, the parameters can be changed such that, when displaying three-dimensional images on the display device 100 according to the present embodiment, appropriate gamma correction is applied in a state that excludes the sub-pixels 173a, 175a and 177a and such that, when displaying two-dimensional images, appropriate gamma correction is applied in a state that includes all the sub-pixels.

In this way, when parameters which are appropriate to the display of three-dimensional images and which are different to those for the display of two-dimensional images are used to correct the picture quality of the image displayed on the image display portion 110, the picture quality of the three-dimensional image displayed on the image display portion 110 can be improved.

Figure 6:
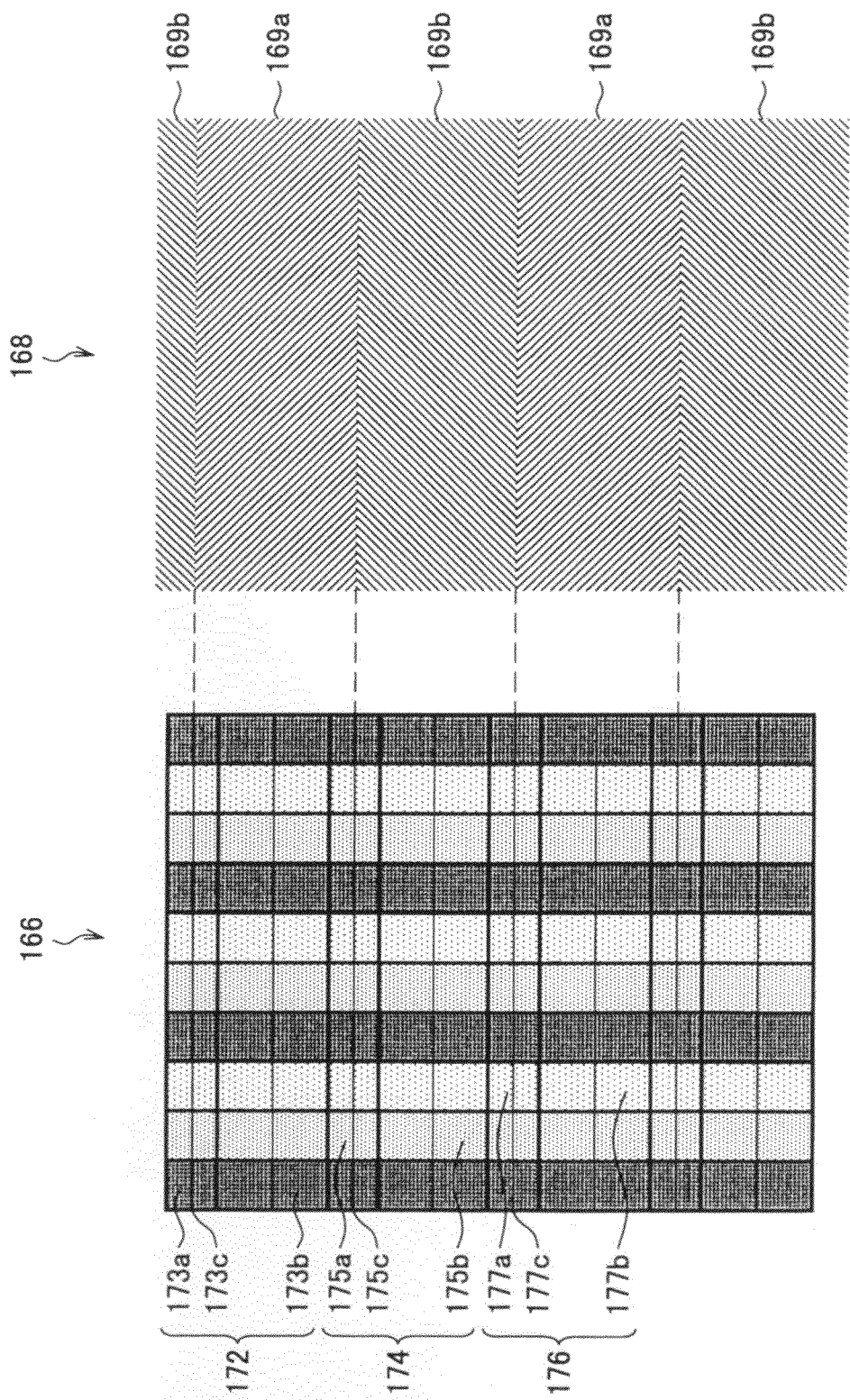

Note that, when the drive system of the display panel 112 is a system other than the TN system, namely, when the drive system of the display panel 112 is, for example, the VA system, the boundaries between the polarization regions 169a and the polarization regions 169b of the polarization control filter 168 may be arranged such that they are aligned with boundaries of liquid crystal domains of the sub-pixels 173a, 175a and 177a. FIG. 6 is an explanatory diagram illustrating a case in which boundaries between the polarization regions 169a and the polarization regions 169b of the polarization control filter 168 are arranged such that they are aligned with boundaries of liquid crystal domains of the sub-pixels 173a, 175a and 177a. Note that in FIG. 6, the polarization control filter 168 is shown alongside the liquid crystal panel 166. Similarly to FIG. 4 and FIG. 5, for explanatory ease, the liquid crystal panel 166 and the polarization control filter 168 are shown alongside each other in the horizontal direction in FIG. 6, but in the actual display device 100, the polarization control filter 168 is provided on the front surface of the liquid crystal panel 166 (the side of the viewer).

In the example shown in FIG. 6, the polarization control filter 168 is positioned on the front surface of the liquid crystal panel 166 such that domain boundaries 173c, 175c and 177c of the sub-pixels 173a, 175a and 177a are aligned with the boundaries between the polarization regions 169a and the polarization regions 169b. By positioning the polarization control filter 168 in this way, when displaying a three-dimensional image on the image display portion 110, the influence of the boundaries between the polarization regions 169a and the polarization regions 169b can be reduced, and the occurrence of crosstalk can be suppressed.

The array of pixels on the liquid crystal panel 166 according to the first embodiment of the present invention is explained above. In the present embodiment, two sub-pixels are provided for each of the color pixels, but in the present invention, the number of sub-pixels per pixel is not limited to this example, and three or more sub-pixels may be provided.

3. CONCLUSION

As described above, with the display device 100 according to the embodiment of the present invention, each pixel is formed of a plurality of sub-pixels. When a three-dimensional image is displayed on the image display portion 110, among the plurality of sub-pixels, one of the sub-pixels is displayed in black and the other pixels are used to display the image. Further, when displaying a two-dimensional image on the image display portion 110, the sub-pixels that are displayed in black during the display of the three-dimensional image are also used to display the two-dimensional image.

In this way, by changing the display of the sub-pixels for the display of the two-dimensional image and the display of the three-dimensional image, the occurrence of crosstalk can be suppressed during the display of the three-dimensional image without arranging black matrices on the polarization control filter. In addition, because black matrices are not arranged on the polarization control filter, deterioration of luminance during the display of the two-dimensional image can also be avoided.

Furthermore, with the display device 100 according to the embodiment of the present invention, when the three-dimensional image is displayed on the image display portion 110, the sub-pixels 173a, 175a and 177a, which have a shorter length in the vertical direction than the other sub-pixels, are displayed in black. By displaying the sub-pixels 173a, 175a and 177a, which have a shorter length in the vertical direction than the other sub-pixels, in black in this way, the display device 100 can display the three-dimensional image without any impairment of luminance and picture quality.

Moreover, with the display device 100 according to the embodiment of the present invention, the polarization control filter 168 may be positioned such that the boundaries between the polarization regions 169a and the polarization regions 169b of the polarization control filter 168 are aligned with the boundaries between the liquid crystal domains of the sub-pixels 173a, 175a and 177a. By positioning the polarization control filter 168 in this way, when displaying the three-dimensional image on the image display portion 110, the influence of the boundaries between the polarization regions 169a and the polarization regions 169b can be reduced, and the occurrence of crosstalk can be suppressed.

It should be understood by those skilled in the art that various modifications, combinations, sub-combinations and alterations may occur depending on design requirements and other factors insofar as they are within the scope of the appended claims or the equivalents thereof.

For example, in the above-described embodiment, when a three-dimensional image is displayed on the image display portion 110, by displaying the sub-pixels 173a, 175a and 177a in black, the sub-pixels 173a, 175a and 177a perform a similar function to black matrices on the polarization control filter. However, the present invention is not limited to this example. For example, when the sub-pixels 173a, 175a and 177a are once displayed in black, by then not supplying a new signal to (not writing into) the sub-pixels 173a, 175a and 177a, the sub-pixels 173a, 175a and 177a may be caused to perform a function similar to that of the black matrices of the polarization control filter used on the display device according to the example of the known art.

Additionally, in the above-described embodiment, the display device 100 is a liquid crystal display device that uses the liquid crystal panel 166, but the present invention is not limited to this example. Insofar as the display device can display both a two-dimensional image and a three-dimensional image, the display device may be a device other than a liquid crystal display device that uses a liquid crystal panel. For example, the display device may be a display device that uses an organic EL panel.

What is claimed is:

1. A display device comprising:
   a liquid crystal panel portion, on which a plurality of sub-pixels that each have a discrete bus line form an individual pixel, the plurality of sub-pixels that form the individual pixel being sequentially arranged in a vertical direction, the panel portion displaying one of a two-dimensional image and a three-dimensional image by application of a signal via the bus line;
   a filter portion that is provided on a front surface of the panel portion and that alternately changes, for each of predetermined horizontal regions, a polarization state of light that passes through the panel portion; and
   a signal supply control portion that controls supply of an image signal to the panel portion,
   wherein when a respective individual pixel has more than two sub-pixels a length in the vertical direction of a respective first sub-pixel is shorter than a length in the vertical direction of a respective second sub-pixel one of the first sub-pixel and second sub-pixel is positioned on a boundary of a respective horizontal region of the filter portion, and the three-dimensional image is displayed on the panel portion, the signal supply control portion supplies the image signal that causes the sub-pixel positioned on the boundary of a respective horizontal region of the filter portion to be displayed in black, and
   wherein boundaries between the horizontal regions of the filter portions are arranged such that they overlap with the sub-pixels displayed in black, do not overlap with any boundary between a sub-pixel displayed in black and another sub-pixel, and do not overlap with any sub-pixel not displayed in black.

2. The display device according to claim 1, wherein
   after the sub-pixels positioned on the boundary of a respective horizontal region of the filter portion are displayed in black, the signal supply control portion performs control such that a new signal is not supplied to the sub-pixels positioned on the boundary of a respective horizontal region of the filter portion.

3. The display device according to claim 1, wherein
   the signal supply control portion changes parameters relating to correction of picture quality of the image signal supplied to the plurality of sub-pixels such that the parameters are different when the two-dimensional image is displayed on the panel portion to when the three-dimensional image is displayed on the panel portion.

4. The display device according to claim 1, wherein when said respective individual pixel has three or more sub-pixels, the sub-pixels of said respective individual pixel are formed such that the length in the vertical direction of a respective sub-pixel displayed in black is shorter than a sum of the lengths in the vertical direction of the respective other sub-pixels in said respective individual pixel.

* * * * *